US006442196B1

(12) United States Patent
Quicksall

(10) Patent No.: US 6,442,196 B1
(45) Date of Patent: Aug. 27, 2002

(54) DATA COMMUNICATIONS SYSTEM

(75) Inventor: Edward S. Quicksall, Longmont, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/127,647

(22) Filed: Jul. 31, 1998

(51) Int. Cl.[7] .............................................. H04L 5/16
(52) U.S. Cl. ..................................... 375/220; 375/340
(58) Field of Search ................................. 375/220, 219, 375/377, 340; 714/749; 379/93.05

(56) References Cited

U.S. PATENT DOCUMENTS

| | | | | |
|---|---|---|---|---|
| 4,053,712 A | * | 10/1977 | Reindl ......................... | 375/340 |
| 4,631,666 A | * | 12/1986 | Harris et al. ................. | 710/129 |
| 5,103,445 A | * | 4/1992 | Ostlund ....................... | 370/329 |
| 6,243,496 B1 | * | 6/2001 | Wilkinson ................... | 382/245 |
| 6,366,623 B1 | * | 4/2002 | Dupuy ........................ | 375/340 |

OTHER PUBLICATIONS

Williams Stallings, Data and Computer Comm., Macmillian Publishing, 97–152, 1985.*
IBM Systems Reference Library, General Information—Binary Synchonous Communications GA27–3004–2.

* cited by examiner

*Primary Examiner*—Chi Pham
*Assistant Examiner*—Kevin M Burd
(74) *Attorney, Agent, or Firm*—Patton Boggs LLP

(57) ABSTRACT

The invention includes a method for transferring user data between a first data communications device and a second data communications device over a data link. The first data communications device transmits a DLE-BEL to the second data communications device to request initialization. The second data communications device transmits a DLE-SI to the first data communications device in response to the DLE-BEL to indicate initialization to receive the user data. The first data communications device transmits a DLE-STX to the second data communications device in response to the DLE-SI to identify the start of a frame of user data. The first data communications device transmits at least a portion of the user data to the second data communications device after transmitting the DLE-STX. The first data communications device transmits a frame-ending control code to the second data communications device after transmitting the user data. The frame-ending control code is either a DLE-ETB, DLE-ETX, or DLE-ESC. A DLE-ETB indicates an end to the frame with more frames to come. A DLE-ETX indicates an end to the frame and to the data transaction. A DLE-ESC indicates an end to the frame and a line-turn. The first data communications device transmits check values to the second data communications device. The second data communications device transmits a DLE-p or a DLE-a to the first data communications device in response to processing the check values to acknowledge that the frame of user data is error-free.

26 Claims, 8 Drawing Sheets

DATA COMMUNICATIONS SYSTEM

FIELD OF THE INVENTION

The invention is related to the field of data communications, and in particular, to a system for transferring data over a serial data link between data communication devices.

Problem

The use of data communications systems has become a critical factor in technological development and economic growth. Data communications devices, such as computers, microprocessors, and disk drives, communicate using a variety of data communications protocols. A well-known data communications protocol is Binary Synchronous Communications (BSC) that was developed by IBM in the mid-1960s.

BSC is based on the transmission of a single stream of binary bits. The bit stream includes binary-encoded user data and control codes. The data communications system uses the control codes to set-up and release the data link, to de-limit the user data, and to perform error checks. BSC is described in the various IBM publications. The IBM publication entitled "General Information—Binary Synchronous Communications" with File Number TP-09 and Order Number GA27-3004-2 is hereby incorporated by reference into this application.

Unfortunately, BSC has features that restrict its utility in some current data communications systems. BSC is synchronous and is not suitable for devices that transmit data asynchronously. BSC does not restrict the size of a data block and can overflow the receive buffer unless the buffer is very large. Large buffers add cost to the system. BSC uses polling and selection to establish data links between devices. Polling and selection can lead to contention if two devices simultaneously request control of the data link. Contention only hinders performance in systems where a master device should control the communications.

BSC has an element of complexity that is problematic for some systems. The complexity may require too much skill from the system designer or may simply be unnecessary. BSC has techniques for polling, flow control, and termination that could be simplified or eliminated. For example, BSC has its own set of flow control codes and does not accommodate the standard XOFF-XON flow control codes that are commonly used in asynchronous communications. A system designer must understand and use the flow control in BSC instead of using the standard XOFF and XON codes.

BSC acknowledges transmissions by sequencing acknowledgment codes so an acknowledgment is not attributed to the wrong transmission. The BSC also uses the acknowledgment code to respond to an initialization request. The response to initialization can be confused with an actual acknowledgment and place the system out-of-sequence.

A similar sequencing problem arises with the use of the enquiry code and the end-of-transmission code. BSC places line-bids with an enquiry code. BSC also uses the enquiry code to request the re-transmission of the last acknowledgment. BSC uses an end-of-transmission code to terminate a data transaction. An enquiry code requesting the last acknowledgment can be confused with an enquiry code for a line bid if the end-of-transmission code is lost.

At present there is a need for an asynchronous data communications system that avoids the unneeded complexity of BSC. Such a system should remove contention from link control and avoid buffer overflow. The system should also avoid the flow control and sequencing problems inherent with the BSC control codes.

Solution

The invention overcomes the above problems by providing an asynchronous data communications system that avoids the unneeded complexity of BSC. The data communications system uses a master-slave hierarchy to remove contention from link control. The data communications system separates the user data block into frames to prevent buffer overflow in small buffers. The data communications system adds new control codes and encoding to avoid the flow control and sequencing problems inherent with the BSC control codes. The data communications system also adds a byte count for error checking to increase system reliability. As a result, the invention is easier to use when designing a data communications system.

The invention includes a method for transferring user data between a first data communications device and a second data communications device. The first data communications device transmits a first control code to the second data communications device. The first control code is a DLE-BEL that requests initialization of the second data communications device to receive the user data. The second data communications device transmits a second control code to the first data communications device in response to the first control code. The second control code is a DLE-SI that indicates that the second data communications device is initialized to receive the user data.

The first data communications device transmits a third control code to the second data communications device in response to the second control code. The third control code is a DLE-STX that identifies the start of a frame of user data. After the third control code, the first communications device transmits a count of bytes of user data in the frame. The first data communications device transmits user data to the second data communications device after transmitting the count. The first data communications device transmits a fourth control code to the second data communications device after transmitting the user data. The fourth control code is either a DLE-ETB, DLE-ETX, or DLE-ESC that identifies the end of the frame of user data. The first data communications device transmits a check value to the second data communications device after transmitting the fourth control code.

The second data communications device transmits a fifth control code to the first data communications device in response to processing the count and the check value. The fifth control code is either DLE-p or a DLE-a to acknowledge that the frame of user data is complete and error-free. The use of DLE-p and DLE-a alternates for consecutive frames. It is important to note that the fifth control code DLE-p or DLE-a is different from the second control code DLE-SI. BSC uses the same control code to serve of the functions of both the DLE-SI and the DLE-p or DLE-a. The invention uses a DLE-SI for initialization to avoid any confusion with a subsequent DLE-p or DLE-a that might put the system out-of-sequence.

In some embodiments, the fourth control code is a DLE-ETX that indicates the end of the user data block without any line-turn. The invention does not require a special control code that ends a data transfer session. In contrast, BSC must transmit an End-Of-Transmission (EOT) code to end the data transfer session. The EOT is required because BSC uses the ENQ code for initialization and to query for a lost acknowledgment. If the EOT is not received to end a transaction, then the receiving device treats the next ENQ as a query and not as an initialization. The system is placed out-of-sequence if the block counter is odd. The invention avoids this confusion by using the DLE-BEL for initialization and by using a DLE-ESC to turn the line around. The EOT is eliminated.

In some embodiments, the fourth control code is an ESC that indicates a line-turn. The second data communications device transmits a second frame of the user data to the first data communications device in response to the fourth control codes and after sending the fifth control code. The line-turn is important because it is implemented by the master device, and is the only way the slave can transfer user data. Control by the master avoids any contention problems present in the polling and selection technique used in BSC.

In some embodiments, the first data communications device transmits a seventh control code to the second data communications device if it does not receive an acknowledgment after transmitting the frame of the user data. The seventh control code is a DLE-ENQ. BSC uses the ENQ for both initialization and query upon lost acknowledgment. The invention uses a DLE-ENQ to query for an acknowledgment and uses a DLE-BEL for initialization to avoid any confusion that might put the system out-of-sequence.

The invention allows the use of the standard XON or XOFF flow control codes that are encoded as DC1 and DC3 respectively. If the user data or the check value happens to include a bit string matching DC1 or DC3, then the bit string is encoded with DLE-DC2 and DLE-DC4 respectively and the matching bit strings are replaced by the receiver. BSC does not allow the use of the standard XON and XOFF codes. A BSC user must learn to use the Wait-Before-Transmit Positive Acknowledgment (WACK) and Temporary Text Delay (TTD) codes for flow control.

DETAILED DESCRIPTION

Figure 1:
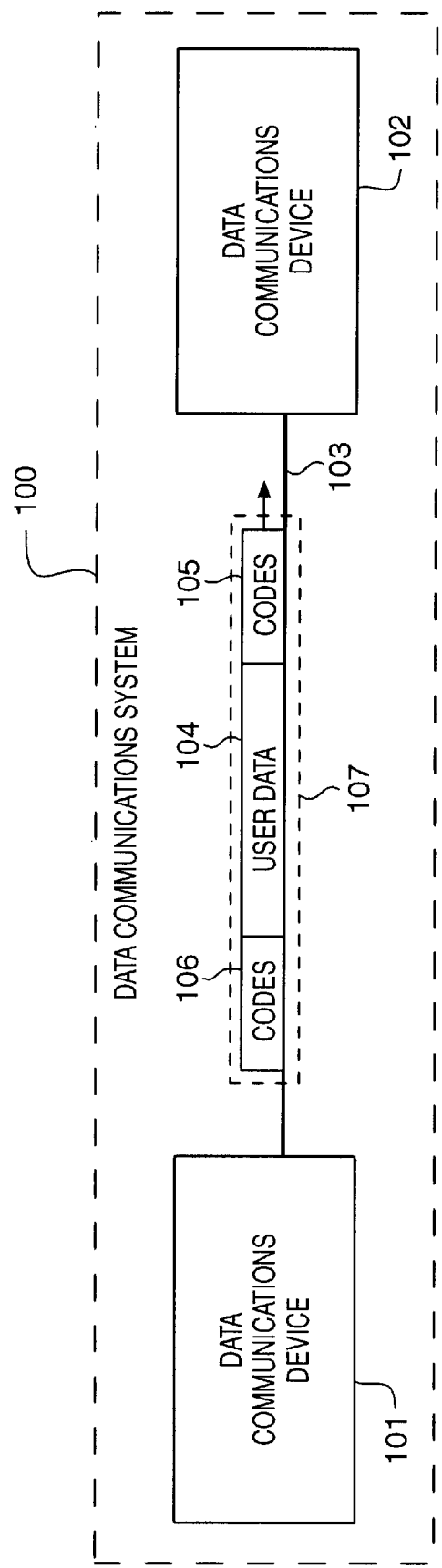
FIG. 1 is a block diagram of a data communications system in an embodiment of the invention.

System Configuration and Control Codes—FIG. 1

FIG. 1 depicts a data communications system 100 that is comprised of a data communications device 101 and a data communications device 102 that are connected by a data link 103. The data link 103 transfers a frame 107 between the data communications devices 101 and 102. The frame 107 is a serial bit stream of logical ones and zeros that is comprised of user data 104 and control codes 105 and 106.

The data communications devices 101 and 102 could be any devices that exchange data in accord with the data protocol disclosed below. Some examples of the data communications devices 101 and 102 are computers, microprocessors, disk drives, printers, and other computer peripheral devices. Each data communications device 101 and 102 is configured with a data link manager that operates the data link for the device. In one example, the data communications device 101 is a computer and the communications device 102 is a disk subsystem. The microprocessor in the computer would use data link manager software in the computer to exchange the user data 104 over the data link 103. The disk controller in the disk drive would use data link manager software in the disk drive to exchange the user data 104 over the data link 103.

The data link 103 could be any medium that transfers data between the data communications devices 101 and 102. One example of the data link 103 is an RS-232 connection. The data link 103 could be operated in a half-duplex mode using one or two lines and a signal ground. The data link 103 could also be operated in a full-duplex mode using two lines and a signal ground.

If the data communications device 101 transmits asynchronously to the data communications device 102, then the data communications device 101 places a start bit in front of each asynchronous transmission and places a stop bit at the end of each asynchronous transmission. The data communications device 102 detects the start bit and uses a clock to detect the rest of the bits in the asynchronous transmission ending with the stop bit. The process is similar for asynchronous transmission from data communications device 102 to data communications device 101.

The communications device 101 transmits the control codes 105 followed by the user data 104 and then the control codes 106. The control codes 105 and 106 are used by the communications devices 101 and 102 to control the transfer of the user data 104 over the data link 103. Each control code is a unique string of bits that signifies some control state. The control codes are typically comprised of eight-bit ASCII characters. The user data 104 can include encoding to mask bit strings in the user data that happen to match a control code.

The communications device 101 is the master and the communications device 102 is the slave. The master must initialize the slave for the slave to participate in a data transaction. Once initialized, the slave is only able to receive user data unless it receives a line-turn control code from the master. The slave may transmit user data to the master after a line-turn, but must return the line back to the master after the data transfer.

User data is transferred in blocks. The blocks of user data can be further separated into frames. The user data 104 and the control codes 105 and 106 comprise the frame 107. The amount of the user data 104 in the frame 107 can be restricted to a particular number of bytes so the storage buffers used by the data communications devices 101 and 102 can be small. For example, the amount of user data in a frame can be restricted to 256 bytes or to 512 bytes. The user data 104 is de-limited by the control codes 105 and 106 to identify the beginning and the end of the user data 104 in the frame 107. The control codes 106 indicate if there are more frames in the block or if a line-turn will occur. The control codes 104 and 106 also include values for checking the accuracy of the data transfer.

Most control codes are preceded by the Data Link Escape (DLE) code to indicate the presence of a control code in the bit stream. The various control codes and check values are described below in the general sequence that they are encountered.

Code Description

DLE-BEL The Line Bid code is sent by a master device to initialize or reset a data communications transaction with a slave device.

DLE-SI The Slave Initialization code is sent by a slave device to the master device in response to a DLE-BEL to signify that the slave is initialized and ready to receive data.

DLE-STX The Start of Text code is sent by the transmitting device to signify the beginning of a frame of user data.

COUNT The count is sent by the transmitting device after the STX and with the user data to indicate the number of bytes of user data in the frame. The count is typically comprised of 16 bits with the least significant bit first. The receiving device re-counts user data bytes for verification against the count.

DLE-ETX The End of Text code is sent by the transmitting device after the user data to signify the end of the frame and the end of the block. The ETX also signifies that there is no line-turn.

DLE-ETB The End of Text Block code is sent by the transmitting device after the user data to signify the end of a frame, but that more frames follow in the block. The ETB also signifies that there is no line-turn.

DLE-ESC The End of Text Sequence with Line-Turn code is sent by the transmitting device after the user data to signify the end of the frame and the end of the block. The ESC also signifies that there is a line-turn so the receiving device becomes the transmitting device after sending an acknowledgment.

BCC The Block Check Character is a value sent by the transmitting device after the ETX, ETB, or ESC for use by the receiving device in error checking. Error checking is typically a 16-bit Cyclic Redundancy Check (CRC-16) that requires two bytes, so the Block Check is transmitted as BCC-BCC.

DLE-a The Positive Acknowledgment code is sent by the receiving device to signify that the previous frame was received without error. The DLE-a is used alternatively with a DLE-p.

DLE-p The Positive Acknowledgment code is sent by the receiving device to signify that the previous frame was received without error. The DLE-p is used alternatively with a DLE-a.

DLE-NAK The Negative Acknowledgment code is sent by the receiving device to signify that the previous block was received with error and that the receiving device is ready for a re-transmission of the faulty block. The NAK is also sent by the slave device as a negative response to a DLE-BEL.

DLE-ENQ The Enquiry code is sent by the transmitting device to request the receiving device to re-transmit the last acknowledgment sent by the receiving device.

DC3 The DC3 code represents the XOFF flow control code for asynchronous communications and is sent by the receiving device to signify that transmission should cease until the receiving device is ready for more data.

DC1 The DC1 code represents the XON flow control code for asynchronous communications and is sent by the receiving device to signify that transmission may resume.

DLE-DC4 The DC4 code is sent by the receiving device to mask a bit string in the user data or in the BCC that happens to match a DC3, but that is not a DC3. The bit string is encoded as DLE-DC4 by the transmitting device, and the DLE-DC4 is replaced with the original bit string by the receiving device.

DLE-DC2 The DC2 code is sent by the receiving device to mask a bit string in the user data or in the BCC that happens to match a DC1, but that is not a DC1. The bit string is encoded as DLE-DC2 by the transmitting device, and the DLE-DC2 is replaced with the original bit string by the receiving device.

DLE-DLE The double Data Link Escape code is sent by both transmitting and receiving devices to mask a bit string in the user data or in the BCC that happens to match a DLE, but that is not a DLE. The bit string is encoded as DLE-DLE by the transmitting device, and the DLE-DLE is replaced with the original bit string by the receiving device.

DLE-TDD The Temporary Text Delay code is sent by the transmitting device to indicate that it is retaining the line, but is not ready to transmit. The receiving device responds to a DLE-TDD with a DLE-NAK.

DLE-WACK The Wait-Before Transmit Positive Acknowledgment code is sent by the receiving device to signify that the previous frame was received without error, but that the receiving device is not ready for more data. The transmitting device responds by sending DLE-ENQ to solicit the expected ACK. The receiving device responds with the proper ACK when it is ready for more data.

Data Transactions—FIGS. 2–7

Figure 2:
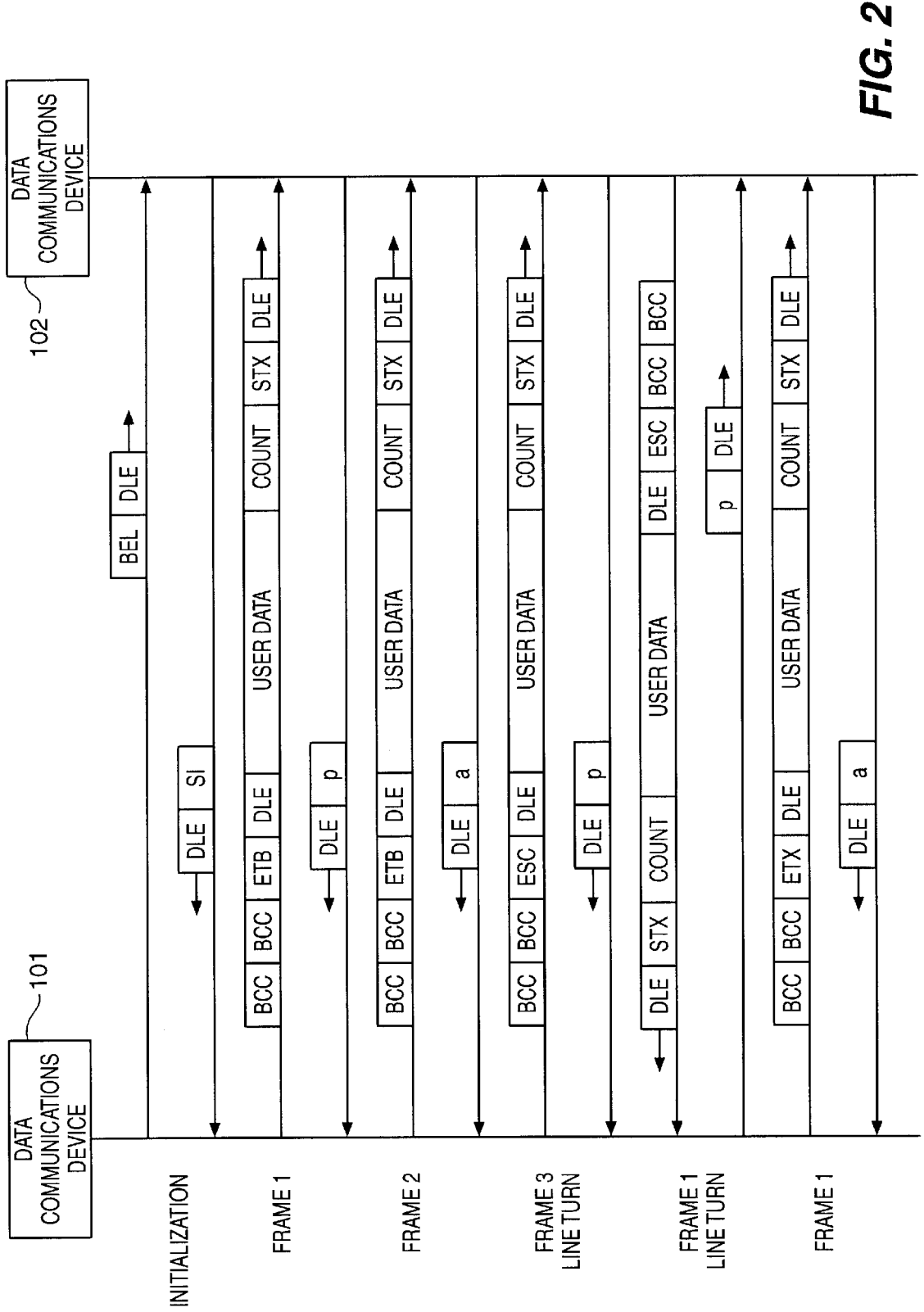
FIG. 2 is an illustration of a data transaction with a line-turn in an embodiment of the invention.

FIG. 2 illustrates a data transaction between the data communications devices 101 and 102. The data communications device 101 initializes the data communications device 102 for a data transaction by transmitting a DLE-BEL to the data communications device 102. The data communications device 102 responds positively by transmitting a DLE-SI to the data communications device 101. The data communications device 102 could have responded negatively to the DLE-BEL by transmitting a DLE-NAK to the data communications device 101. After the DLE-SI, the data communications device 101 and the data communications device 102 reset the acknowledgment sequence so the first acknowledgment sent is a DLE-p. The acknowledgments then individually alternate between DLE-a and DLE-p for each communications device until the next DEL-SI resets the sequence.

After initialization, the data communications device 101 transmits the first frame in the block of data. A DLE-STX signifies the start of the block and the frame. The count and the user data follow the STX. The count could be placed either before or after the user data as desired. The data communications device 101 transmits a DLE-ETB after the user data to signify the end of the first frame in the block and to indicate that additional frames follow in the block. The data communications device 101 transmits a CRC-16 value BCC-BCC at the end of the frame.

The data communications device 102 re-calculates a count and CRC-16 value based on the received data and compares them to the transmitted count and BCC-BCC. The data communications device 102 transmits a DLE-p to the data communications device 101 after successful verification of the count and BCC-BCC in the first frame.

After the first frame is positively acknowledged, the data communications device 101 transmits the second frame to the data communications device 102. The second frame uses the same control codes as the first frame to transmit additional user data. The data communications device 102 responds with a DLE-a after successful verification of the count and BCC-BCC in the second frame.

The data communications device 101 transmits the third frame to the data communications device 102 after the second frame is positively acknowledged. The data communications device 101 uses a DLE-ESC in the third frame. The data communications device 102 transmits a DLE-p to the data communications device 101 after successful verification of the count and BCC-BCC in the third frame.

The ESC signifies the end of the third frame and the end of the block. The ESC also signifies a line-turn after the third frame. The line-turn allows the data communications device 102 to transmit to the data communications device 101. The data communications device 102 transmits a first frame to the data communications device 101. A DLE-STX signifies the start of the first frame, and the count and user data follow the STX. The data communications device 102 transmits a DLE-ESC after the user data to signify the end of the first frame and block with a line-turn. An ETB would have been used if there were more frames in the block. Note that the slave data communications device 102 must return line control to the master data communications device 101 with an ESC.

The data communications device 101 transmits a DLE-p to the data communications device 102 after successful verification of the count and BCC-BCC in the first frame. After the line-turn, the data communications device 101 transmits a frame to the data communications device 102. The frame includes ETX to signify the end of frame and the end of the block. The frame does not need to contain user data. The data communications device 102 transmits DLE-a to the data communications device 101 after successful verification of the count and BCC-BCC.

Note that the data communications device 101 returns a DLE-p to the data communications device 101 since this acknowledgment is the first response for the data communications device 101 since an initialization or reset. Also note that the last acknowledgment sent by the data communications device 102 is a DLE-a since the previous response by that same data communications device 102 was a DLE-p. The communications device 102 starts the acknowledgment sequence with a DLE-p and then alternates its own responses between DLE-a and DLE-p until an initialization or reset. The communications device 102 alternates acknowledgments in a similar manner.

Figure 3:
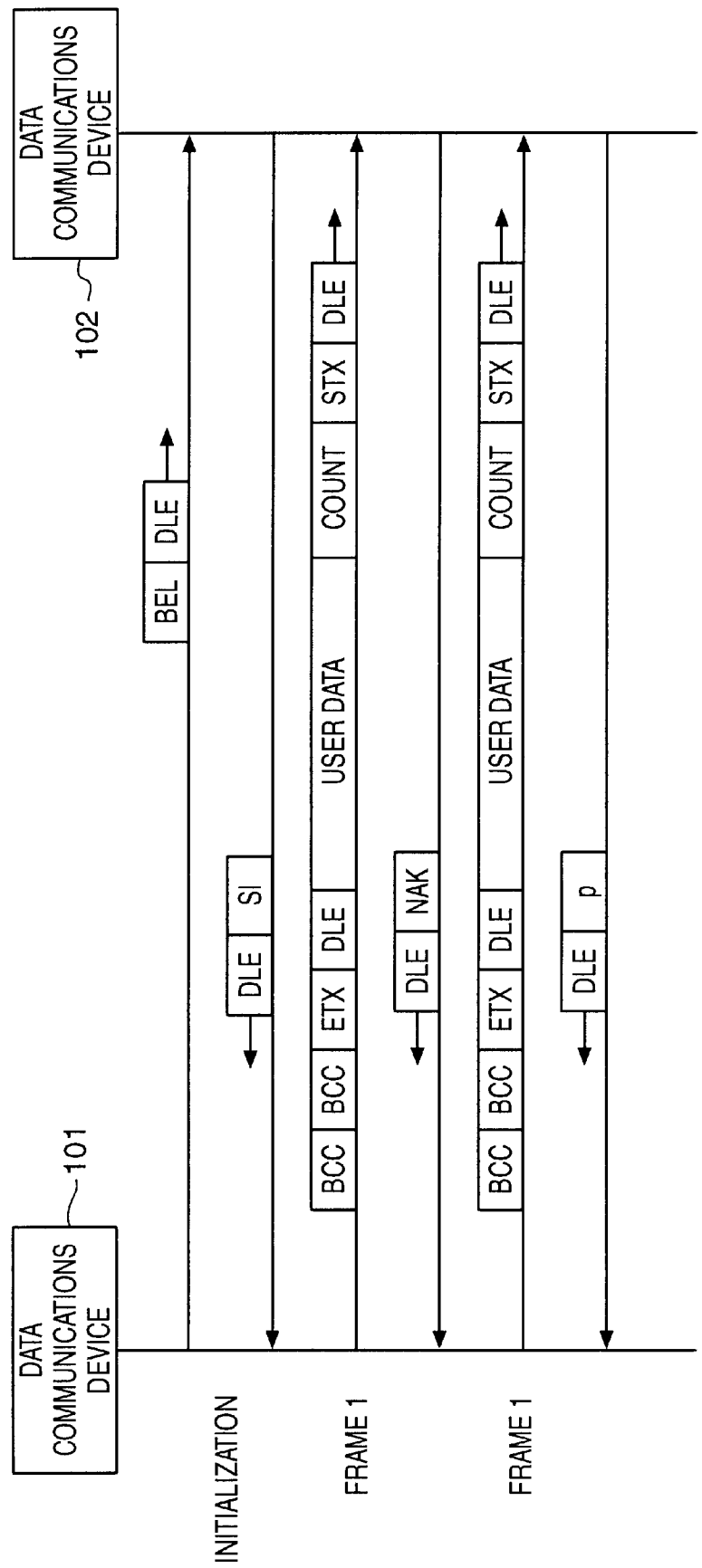
FIG. 3 is an illustration of a data transaction with a negative acknowledgment in an embodiment of the invention.

FIG. 3 illustrates a data transaction between the data communications devices 101 and 102 where a count or a BCC-BCC check identifies an error. The data communications device 101 initializes the data communications device 102 for a data transaction by transmitting a DLE-BEL to the data communications device 102. The data communications device 102 responds positively by transmitting a DLE-SI to the data communications device 101. After successful initialization, the data communications device 101 transmits the first frame in the block of data. A DLE-STX signifies the start of the block and the frame. The count and user data follow the STX. The data communications device 101 transmits a DLE-ETX after the user data to signify the end of the frame and the block. The data communications device 101 transmits a CRC-16 value BCC-BCC at the end of the frame.

The data communications device 102 receives the frame and re-calculates a count and a CRC-16 value for the frame. In this example, either the count or the BCC-BCC does not match the value calculated by the data communications device 102. As a result, the data communications device 102 negatively acknowledges the frame with a DLE-NAK. The data communications device 101 re-transmits the frame in response to receiving the DLE-NAK. The frame is re-transmitted without error, so the data communications device 102 returns a DLE-p.

The count is 16-bit value of the number of bytes of user data in the frame. The BCC-BCC is a 16-bit CRC value calculated over the user data and a portion of the control codes. The STX and the count before the user data are excluded from the calculation. The BCC-BCC and DLEs are also excluded. On FIG. 3, the bits comprising the user data and the ETX are included in the calculation. The CRC-16 calculation first determines the numeric binary value of the bits included in the calculation. The numeric value is then divided by a constant. The remainder of the dividend is the CRC-16 value. The quotient is not used.

Figure 4:
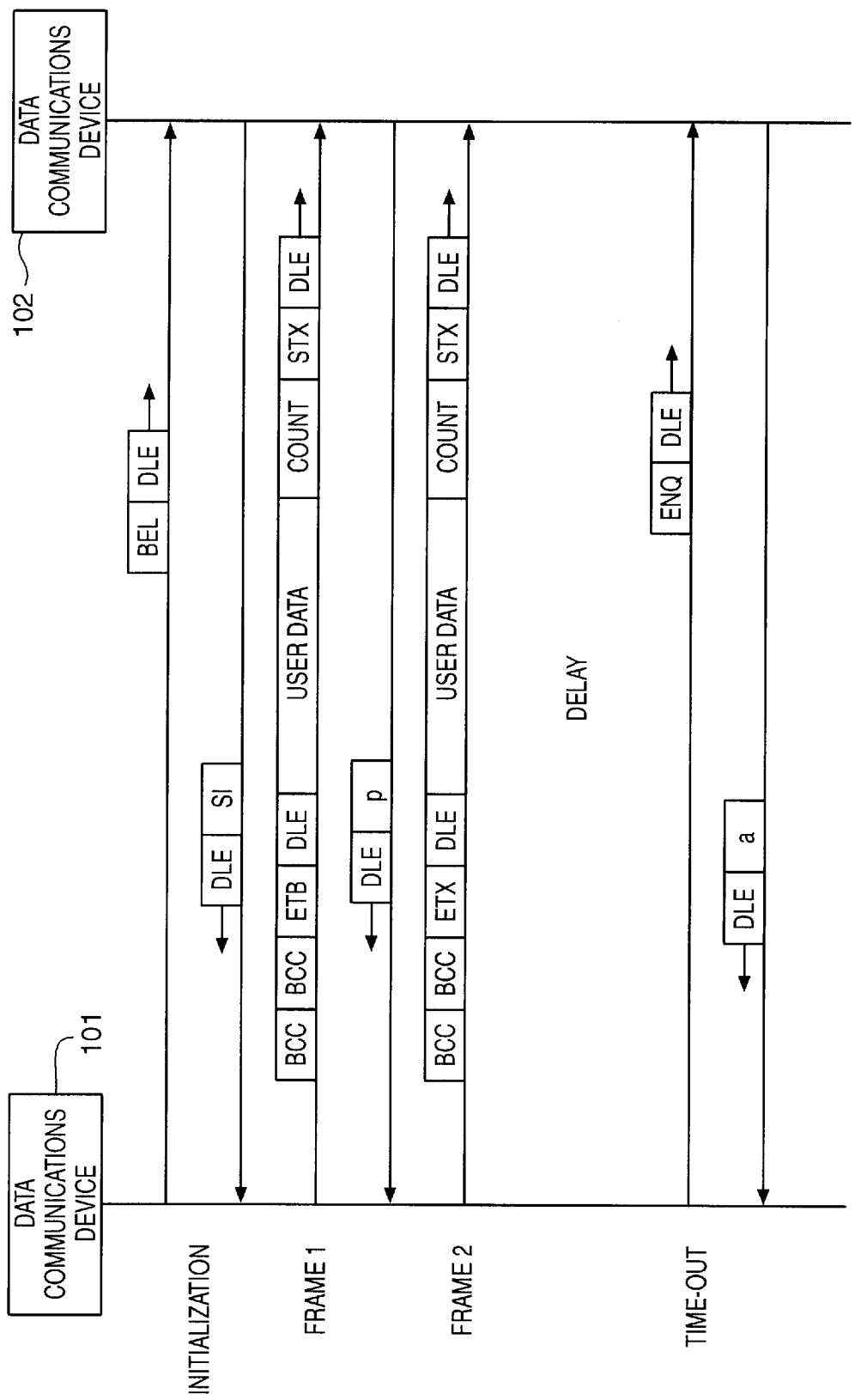
FIG. 4 is an illustration of a data transaction with a time-out in an embodiment of the invention.

FIG. 4 illustrates another data transaction between the data communications devices 101 and 102 where a correct acknowledgment is not received. The data communications device 101 initializes the data communications device 102 for a data transaction by transmitting a DLE-BEL to the data communications device 102. The data communications device 102 responds positively by transmitting a DLE-SI to the data communications device 101. The acknowledgment sequence is reset after the DLE-SI, so a DLE-p is the first acknowledgment.

After successful initialization, the data communications device 101 transmits the first frame of the block of data. A DLE-STX signifies the start of the block and the frame, and the count and the user data follow the STX. The data communications device 101 transmits a DLE-ETB after the user data to signify the end of the frame and that another frame follows in the block. The data communications device 101 places the BCC-BCC at the end of the first frame.

The data communications device 102 receives and checks the first frame. The data communications device 102 sends a DEL-p to acknowledge the successful reception of the first frame. In response to the DLE-p, the data communications device 101 transmits the second frame in the block. A DLE-STX signifies the start of the second frame, and the count and user data follow the STX. The data communications device 101 transmits a DLE-ETX after the user data to signify the end of the second frame and the end of the block. The data communications device 101 places the BCC-BCC at the end of the second frame.

The data communications device 101 experiences a delay in receiving the expected DLE-a or DLE-NAK from the data communications device 102. The delay could be caused by several events: the data communications device 101 could have lost the acknowledgment, the data communications line 103 could have garbled the acknowledgment, or the data communications device 102 may not have sent the acknowledgment. In any event, the delay causes the data communications device 101 to time out. The data communications device 101 transmits a DLE-ENQ in response to the time-out. The data communications device 102 receives the DLE-ENQ and sends the DEL-a.

The transmitting device sends a DLE-ENQ after a transmit time-out. For the first frame, the receiving device responds with a DLE-a, and not a DLE-SI. The transmitting device re-sends the first frame in response to the DLE-a. If an acknowledgment message is unintelligible, the transmitting device waits and ignores any responses for a period of transmit time-out seconds.

The data communications devices 101 and 102 use time-out procedures to identify problems. A line-bid time-out is used after the master sends a DLE-BEL. The master sets a timer and waits for a DLE-SI or DLE-NAK. If the timer expires before a DLE-SI or DLE-NAK is received, then the master attempts recovery procedures. A transmit time-out is used after a transmitting device sends a DLE-STX. The transmitting device sets a timer and waits for a DLE-p, DLE-a, DLE-NAK, or DLE-WACK. If the timer expires before a DLE-p, DLE-a, DLE-NAK, or DLE-WACK is received, then the transmitting device attempts recovery procedures. A receive time-out is used after a receiving device receives a DLE-STX. The receiving device sets a timer and waits for a DLE-ETX, DLE-ESC, or DLE-ETB. If the timer expires before a DLE-ETX, DLE-ESC, or DLE-ETB is received, then the receiving device ignores all data for the receive time-out time period. The receive time-out is long enough to receive a full frame and control codes, but shorter than a transmit time-out.

The recovery count specifies the number of times a device attempts to recover from a time-out or other error. If the recovery count is three, the master sends three DLE-ENQs or receives three DLE-NAKs before attempting to reset the slave. The master attempts to reset the slave three times. In some embodiments of the invention, the line-bid time-out and the receive time-out are one second. The transmit time out is two seconds. The number of recovery attempts is three.

Figure 5:
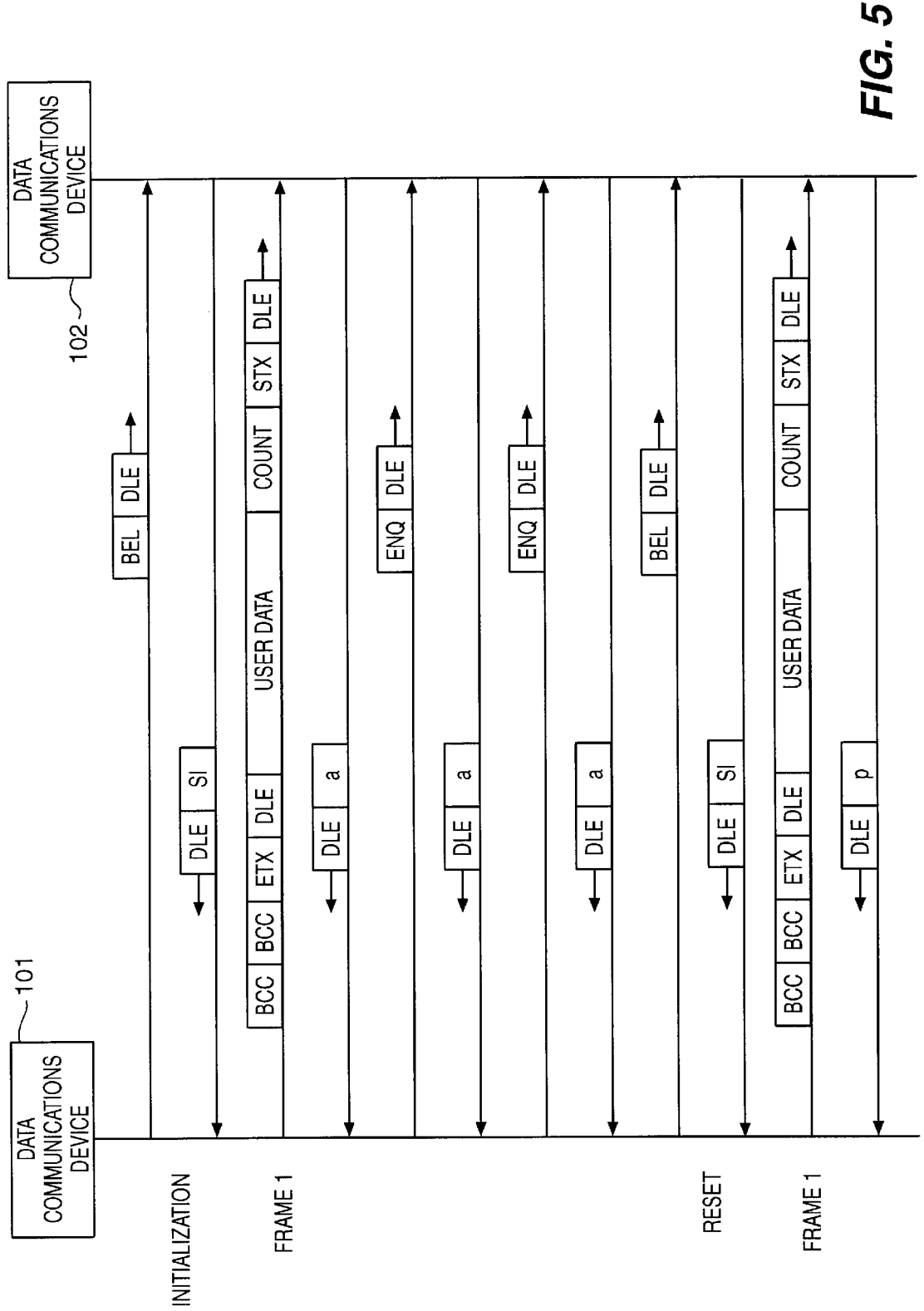
FIG. 5 is an illustration of a data transaction with a reset in an embodiment of the invention.

FIG. 5 illustrates another data transaction between the data communications devices 101 and 102 where a reset is required. The data communications device 101 initializes the data communications device 102 for a data transaction by transmitting a DLE-BEL to the data communications device 102. The data communications device 102 responds positively by transmitting a DLE-SI to the data communications device 101. The acknowledgment sequence is reset after the DLE-SI, so a DLE-p should be the first acknowledgment.

After successful initialization, the data communications device 101 transmits the first frame of the block of data. A DLE-STX signifies the start of the block and the frame. The count and the user data follow the STX. The data communications device 101 transmits a DLE-ETX after the user data to signify the end of the frame and the block. The data communications device 101 places the BCC-BCC at the end of the first frame.

The data communications device 102 incorrectly sends a DEL-a to acknowledge the successful reception of the first frame. A DLE-p should be sent since the acknowledgment sequence was reset after initialization. The data communications device 101 transmits a DLE-ENQ in response to the incorrect acknowledgment. The data communications device 102 receives the DLE-ENQ and incorrectly sends the DEL-a. The data communications device 101 transmits a second DLE-ENQ in response to the second incorrect acknowledgment. The data communications device 102 receives the second DLE-ENQ and again incorrectly sends the DEL-a.

The data communications device 101 is programmed with a recovery count of two, so the data communications device 101 does not attempt another DLE-ENQ. Instead, the data communications device 101 resets the data communications device by sending a DLE-BEL. The data communications device 102 responds positively by transmitting a DLE-SI to the data communications device 101. The acknowledgment sequence is reset after the DLE-SI, so a DLE-p should be the first acknowledgment.

After successful initialization, the data communications device 101 re-transmits the frame. A DLE-STX signifies the start of the block and the frame. The count and the user data follow the STX. The data communications device 101 transmits a DLE-ETX after the user data to signify the end of the frame and the block. The data communications device 101 places the BCC-BCC at the end of the first frame. The data communications device 102 verifies the frame and correctly sends a DEL-p.

The data communications devices 101 and 102 are able to reset the data transaction at any time by transferring a DLE-BEL. If the slave data communications device 102 receives a DLE-BEL from the master, then it resets and responds with a DLE-SI or DLE-NAK. If the master data communications device 101 receives a DLE-BEL from the slave, then it reports the error and sends a DLE-BEL to re-initialize the slave.

Figure 6:
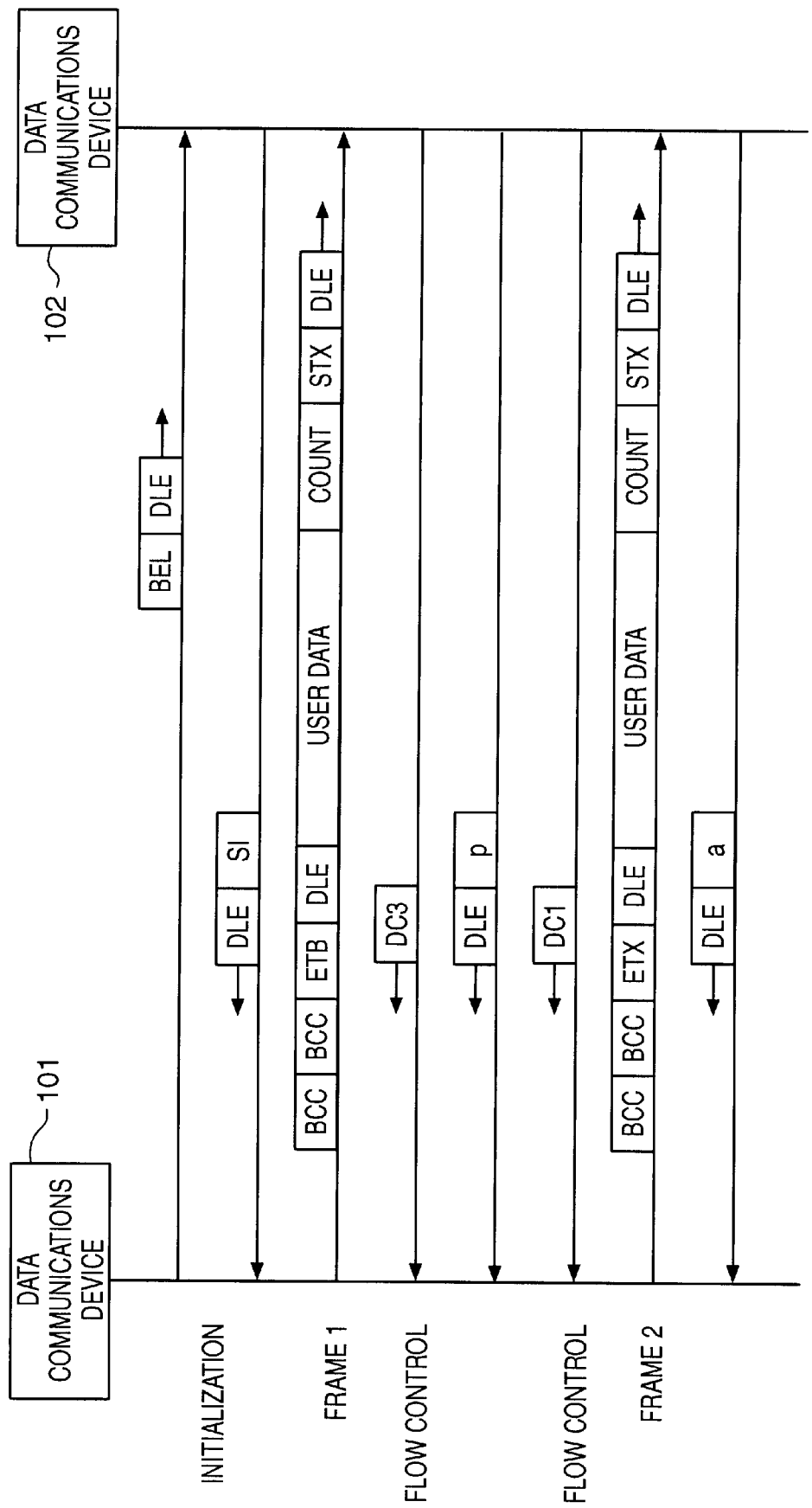
FIG. 6 is an illustration of a data transaction with flow control in an embodiment of the invention.

FIG. 6 illustrates another data transaction between the data communications devices 101 and 102 where flow control is required. Flow control is an important aspect of asynchronous systems. A common technique for asynchronous flow control is for the receiver to send an XOFF code when transmission should cease to send an XON code when transmission may resume. For example, if the receive buffer is full, the receiver transmits an XOFF until processing clears the receive buffer. The receiver transmits an XON when the receive buffer is ready for more data.

On FIG. 6, the data communications device 101 initializes the data communications device 102 for a data transaction by transmitting a DLE-BEL to the data communications device 102. The data communications device 102 responds positively by transmitting a DLE-SI to the data communications device 101. After successful initialization, the data communications device 101 transmits the first frame of the block of data including the DLE-STX, count, user data, DLE-ETB, and BCC-BCC.

The data communications device 102 receives the frame and sends a DC3 to the data communications device 101 in order to suspend the data transfer. The DC3 represents the XOFF flow control code known in the art. The data communications device 102 also sends a DLE-p to the data communications device 101 to positively acknowledge the frame. The data communications device 102 sends a DC1 to the data communications device 101 when it is ready to resume the data transfer. The DC1 represents the XON flow control code known in the art. Note that the use of DC1 and DC3 can occur in the middle of a data block.

The data communications device 101 sends the second frame in the block after the DC1 is received. The second frame includes the DLE-STX, count, user data, DLE-ETX, and BCC-BCC. The data communications device 102 verifies the frame and positively acknowledges the frame by sending a DLE-a to the data communications device 101.

Figure 7:
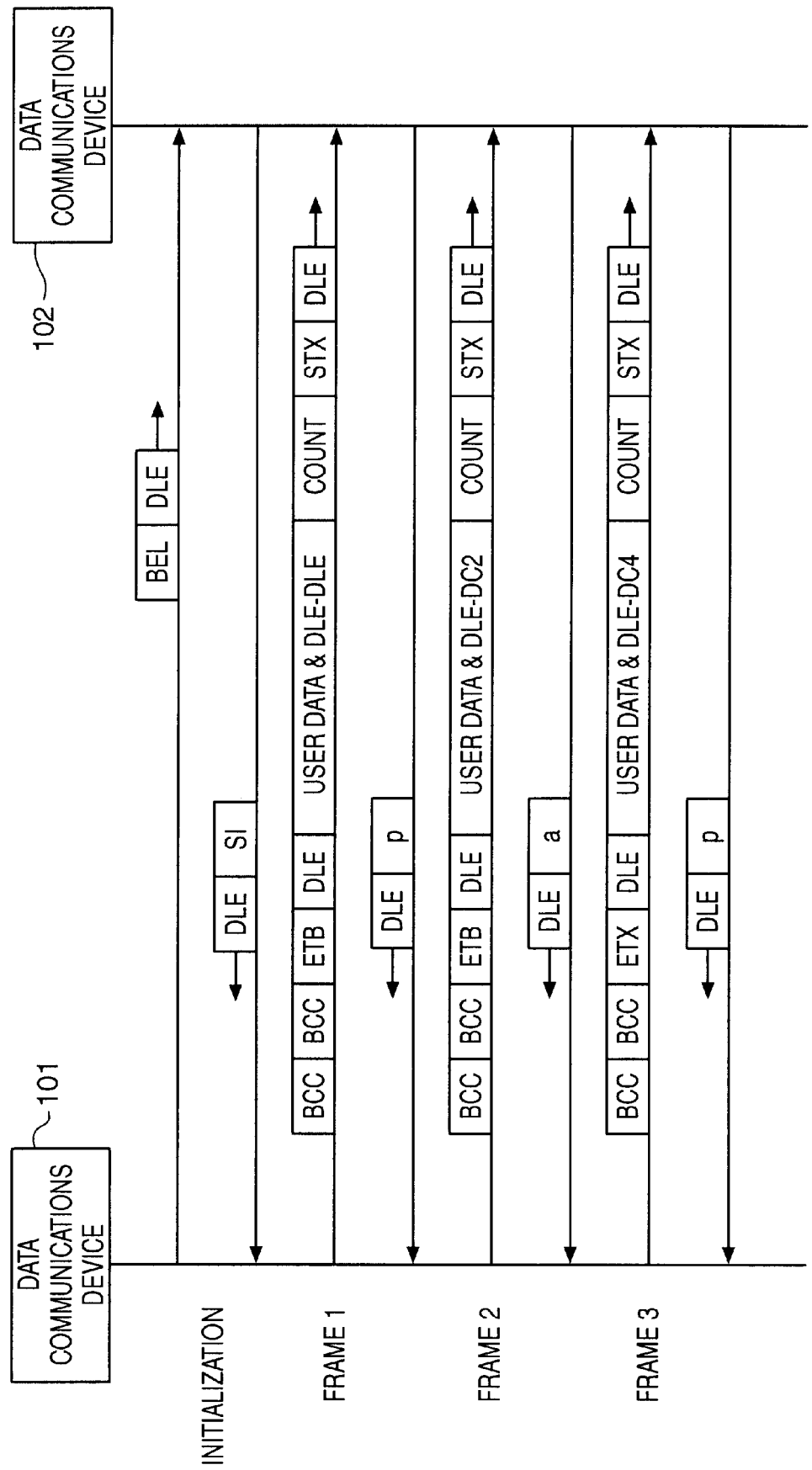
FIG. 7 is an illustration of a data transaction with encoded user data in an embodiment of the invention.

FIG. 7 illustrates another data transaction between the data communications devices 101 and 102 where encoding is required. The data communications device 101 initializes the data communications device 102 for a data transaction by transmitting a DLE-BEL to the data communications device 102. The data communications device 102 responds positively by transmitting a DLE-SI to the data communications device 101. After successful initialization, the data communications device 101 transmits three frames in the block of data. Each frame includes the DLE-STX, count, user data, DLE-ETB or DLE-ETX, and BCC-BCC. Each frame is positively acknowledged by the data communications device 102.

In the first frame, the user data included a bit string that happened to match the DLE character bit sequence. The data communications device 101 encodes the bit string as DLE-DLE in the user data. The data communications device 102 replaces the DLE-DLE with the original bit string of user data.

In the second frame, the user data included a bit string that happened to match the DC1 character bit sequence. The data communications device 101 encodes the bit string as DLE-DC2 in the user data. The data communications device 102 replaces the DLE-DC2 with the original bit string of user data.

In the third frame, the user data included a bit string that happened to match the DC3 character bit sequence. The data communications device 101 encodes the bit string as DLE-DC4 in the user data. The data communications device 102 replaces the DLE-DC4 with the original bit string of user data. The same encoding techniques are also used for matching bit strings in the BCC-BCC.

Figure 8:
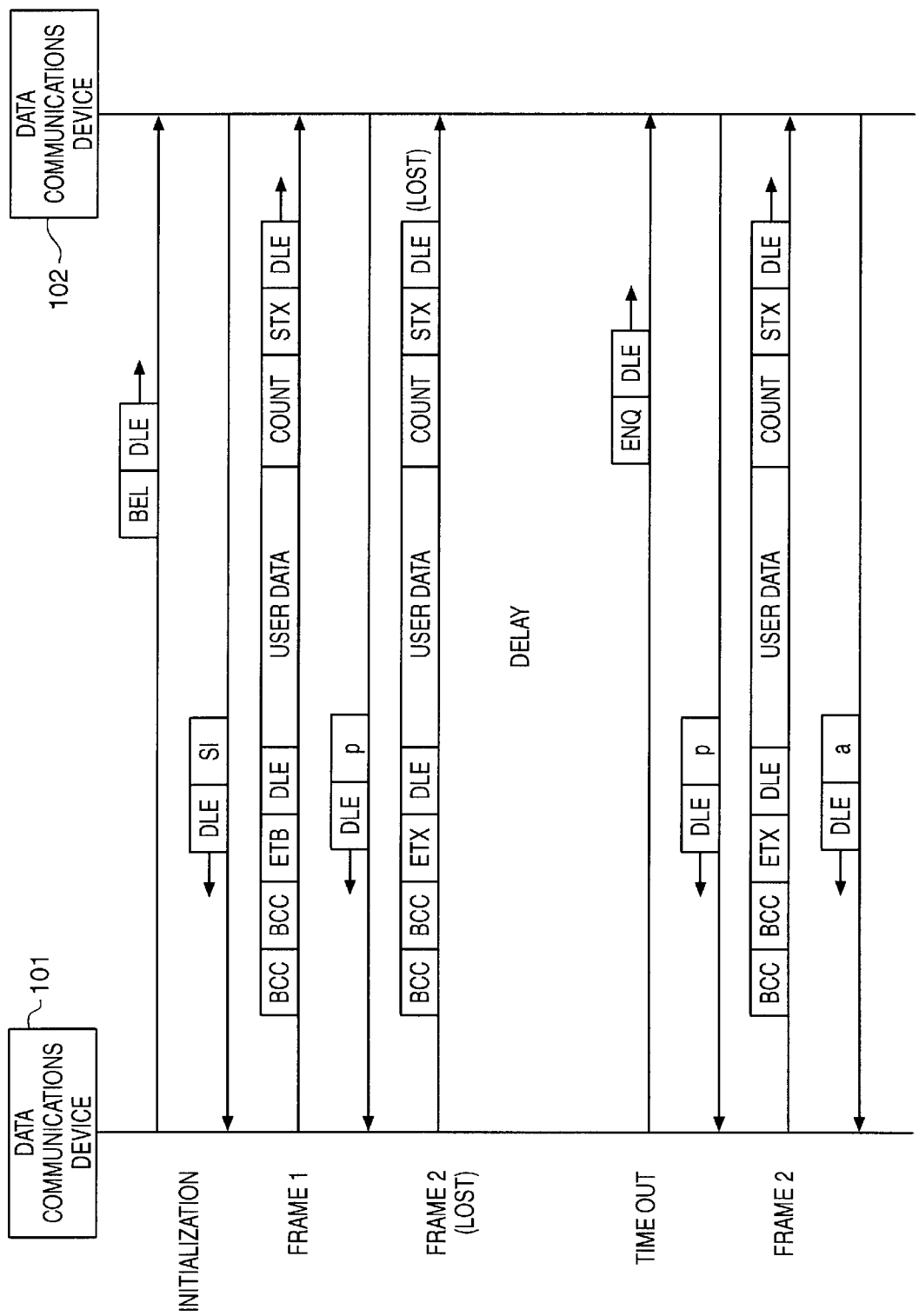
FIG. 8 is an illustration of a data transaction with lost frame recovery in an embodiment of the invention.

FIG. 8 illustrates another data transaction between the data communications devices 101 and 102 where a frame is lost. The data communications device 101 initializes the data communications device 102 for a data transaction by transmitting a DLE-BEL to the data communications device 102. The data communications device 102 responds positively by transmitting a DLE-SI to the data communications device 101. The acknowledgment sequence is reset after the DLE-SI, so a DLE-p is the first acknowledgment.

After successful initialization, the data communications device 101 transmits the first frame of the block of data. A DLE-STX signifies the start of the block and the frame, and the count and the user data follow the STX. The data communications device 101 transmits a DLE-ETB after the user data to signify the end of the frame and that another frame follows in the block. The data communications device 101 places the BCC-BCC at the end of the first frame.

The data communications device 102 receives and checks the first frame. The data communications device 102 sends a DEL-p to acknowledge the successful reception of the first frame. In response to the DLE-p, the data communications device 101 transmits the second frame in the block. A DLE-STX signifies the start of the second frame, and the count and user data follow the STX. The data communications device 101 transmits a DLE-ETX after the user data to signify the end of the second frame and the end of the block. The data communications device 101 places the BCC-BCC at the end of the second frame.

The second frame is lost so an acknowledgment is not sent by data communications device 102. The data communications device 101 senses a delay in receiving the expected acknowledgment from the data communications device 102. The delay causes the data communications device 101 to time out and transmit a DLE-ENQ. The data communications device 102 receives the DLE-ENQ and sends the DEL-p that acknowledged the first frame, since the second frame was not processed or acknowledged.

The data communications device 101 determines that the second frame was lost because it receives the DLE-p for the first frame in response to the DLE-ENQ. The DLE-p indicates that the first frame was the last frame correctly received by the data communications device 102. As a result, the data communications device 101 re-sends the second frame. The data communications device 102 then acknowledges the second frame with a DLE-a. Thus, the lost second frame is recovered.

Those skilled in the art can appreciate variations of the above-described embodiments that fall within the scope of the invention. As a result, the invention is not limited to the specific embodiments discussed above, but only by the following claims and their equivalents.

What is claimed is:

1. A method for asynchronously transferring user data between a first data communications device and a second data communications device over a data link, the method comprising:

transmitting a first control code from the first data communications device to the second data communications device wherein the first control code requests initialization of the second data communications device to receive the user data;

transmitting a second control code from the second data communications device to the first data communications device in response to the first control code, wherein the second control code indicates that the second data communications device is initialized to receive the user data and wherein the second control code is different from other ones of the control codes that acknowledge receipt of the user data;

transmitting a third control code from the first data communications device to the second data communications device in response to the second control code, wherein the third control code identifies a start of a frame of the user data;

transmitting at least a portion of the user data from the first data communications device to the second data communications device after transmitting the third control code;

transmitting a fourth control code from the first data communications device to the second data communications device after transmitting the user data, wherein the fourth control code identifies an end of the frame of the user data;

transmitting a check value from the first data communications device to the second data communications device; and transmitting a fifth control code from the second data communications device to the first data communications device in response to processing the check value, wherein the fifth control code acknowledges that the frame of the user data is error-free, and wherein the fifth control code is different from the second control code;

wherein said user data includes a bit string that happens to match the character bit sequence of one of said control codes; and said method further including the steps of:

at said first data communications device, encoding said bit string that matches said control code as a predetermined control code that does not match said control code;

transmitting said predetermined control code to said second data communications device: and upon receipt of said predetermined control code at said second data communications device, replacing said predetermined code with said bit string of user data that matches said control code.

2. The method of claim 1 wherein the fourth control code indicates an end to a block of the user data.

3. The method of claim 1 wherein the fourth control code also indicates a line-turn and further comprising transmitting a second frame of the user data from the second data communications device to the first data communications device in response to the fourth control code.

4. The method of claim 1 wherein the fourth control code indicates a transfer of a second frame of the user data and further comprising transmitting the second frame of the user data from the first data communications device to the second data communications device in response to the fourth control code.

5. The method of claim 4 wherein the second frame of the user data includes a second check value and further comprising transmitting a sixth control code from the second data communications device to the first data communications device in response to processing the second check value, wherein the sixth control code acknowledges that the second frame of the user data is error-free, and wherein the sixth control code is different from the second control code and is different from the fifth control code.

6. The method of claim 5 further comprising:

transmitting a seventh control code from the first data communications device to the second data communications device in response to not receiving the sixth control code after transmitting the second frame of the user data, wherein the seventh control code is different from the first control code; and re-transmitting the sixth control code from the second data communications device to the first data communications device in response to the seventh control code.

7. The method of claim 1 further comprising:

transmitting a second frame of the user data from the first data communications device to the second data communications device in response to the fifth control code wherein the second frame of the user data includes a second check value;

transmitting a sixth control code from the second data communications device to the first data communications device in response to processing the second check value, wherein the sixth control code acknowledges an error in the second frame of the user data; and re-transmitting the second frame of the user data from the first data communications device to the second data communications device in response to the sixth control code.

8. The method of claim 1 wherein the check value is a Cyclic Redundancy Check value.

9. The method of claim 1 wherein the check value is a count of bytes of the user data in the frame.

10. The method of claim 1 wherein the check value is a Cyclic Redundancy Check value and further comprising transmitting a count of bytes of the user data in the frame from the first data communications device to the second data communications device.

11. The method of claim 1 further comprising re-transmitting the first control code from the first data communications device to the second data communications device to reset the second data communications device.

12. The method of claim 1 wherein the control codes include a Data Link Escape code.

13. The method of claim 1 further comprising transmitting a control code representing an XOFF flow control code from the second data communications device to the first data communications device.

14. The method of claim 1 further comprising transmitting a control code representing an XON flow control code from the second data communications device to the first data communications device.

15. The method of claim 1 wherein said step of encoding comprises encoding a bit string that matches a code representing an XOFF flow control code but is not the code representing an XOFF flow control code.

16. The method of claim 1 wherein said step of encoding comprises encoding a bit string that matches a code representing an XON flow control code but is not the code representing an XON flow control code.

17. The method of claim 1 wherein said step of encoding comprises encoding a bit string that matches a code but is not the Data Link Escape code.

18. The method of claim 1 further comprising restricting the frame to not more than a number of bytes of the user data.

19. The method of claim 1 further comprising restricting the frame to not more than 256 bytes of the user data.

20. The method of claim 1 further comprising restricting the frame to not more than 512 bytes of the user data.

21. The method of claim 1 wherein transmitting the user data further comprises transmitting the user data asynchronously.

22. The method of claim 1 wherein transmitting the user data further comprises further comprises transmitting the user data over an RS-232 connection.

23. The method of claim 1 wherein the second data communications device cannot transmit the user data to the first data communications device without receiving the first control code and the fourth control code and wherein the fourth control code indicates a line-turn.

24. The method of claim 1 wherein the first data communications device is a microprocessor.

25. The method of claim 1 wherein the first data communications device is a computer.

26. The method of claim 1 wherein the second data communications device is a disk drive.

* * * * *